(12) United States Patent
Gavin

(10) Patent No.: US 7,066,306 B2
(45) Date of Patent: Jun. 27, 2006

(54) SELF-VENTILATING DISC BRAKE ROTOR

(76) Inventor: Stephen Patrick Gavin, 15 Namoi Close, Bateau Bay, New South Wales (AU)

( * ) Notice: Subject to any disclaimer, the term of this patent is extended or adjusted under 35 U.S.C. 154(b) by 0 days.

(21) Appl. No.: 10/798,654

(22) Filed: Mar. 11, 2004

(65) Prior Publication Data

US 2004/0188196 A1   Sep. 30, 2004

Related U.S. Application Data

(63) Continuation-in-part of application No. 10/459,766, filed on Jun. 12, 2003, now abandoned, which is a continuation-in-part of application No. 09/888,942, filed on Jul. 25, 2001, now abandoned.

(30) Foreign Application Priority Data

May 10, 2001   (AU) ..................... PR4864

(51) Int. Cl.
*F16D 65/12*   (2006.01)
(52) U.S. Cl. .............................. 188/218 XL
(58) Field of Classification Search ......... 188/218 XL, 188/264 A, 264 AA; D12/180
See application file for complete search history.

(56) References Cited

U.S. PATENT DOCUMENTS

| | | | | |
|---|---|---|---|---|
| 4,745,996 A | * | 5/1988 | Wirth | 188/218 XL |
| 5,542,503 A | * | 8/1996 | Dunn et al. | 188/18 A |
| 6,152,270 A | * | 11/2000 | Giorgetti | 188/218 XL |
| 6,367,599 B1 | * | 4/2002 | Kobayashi | 188/218 XL |
| 6,390,250 B1 | * | 5/2002 | Nakamura et al. | 188/218 XL |
| 6,564,912 B1 | * | 5/2003 | Koschinat | 188/218 XL |
| 6,626,273 B1 | * | 9/2003 | Baumgartner et al. | 188/264 A |
| 2002/0166738 A1 | * | 11/2002 | Gavin | 188/218 XL |
| 2004/0118644 A1 | * | 6/2004 | Oberti et al. | 188/218 XL |

* cited by examiner

*Primary Examiner*—Devon C. Kramer
(74) *Attorney, Agent, or Firm*—Jacobson and Johnson

(57) ABSTRACT

There is a brake disc rotor having a central hub (1) co-axial with surrounding rings (2) which form brake bands (3) for engagement with brake pads. The rings (3) are supported in a spaced apart parallel configuration with channels (12) therebetween whereby in use of the rotor cooling air is drawn in through vent openings formed around the inner periphery of the rings (3) and then radially outwardly through the channels (12) as the rotor turns. The vent openings include inlet vent ports (7) on the outboard side of the rotor.

22 Claims, 6 Drawing Sheets

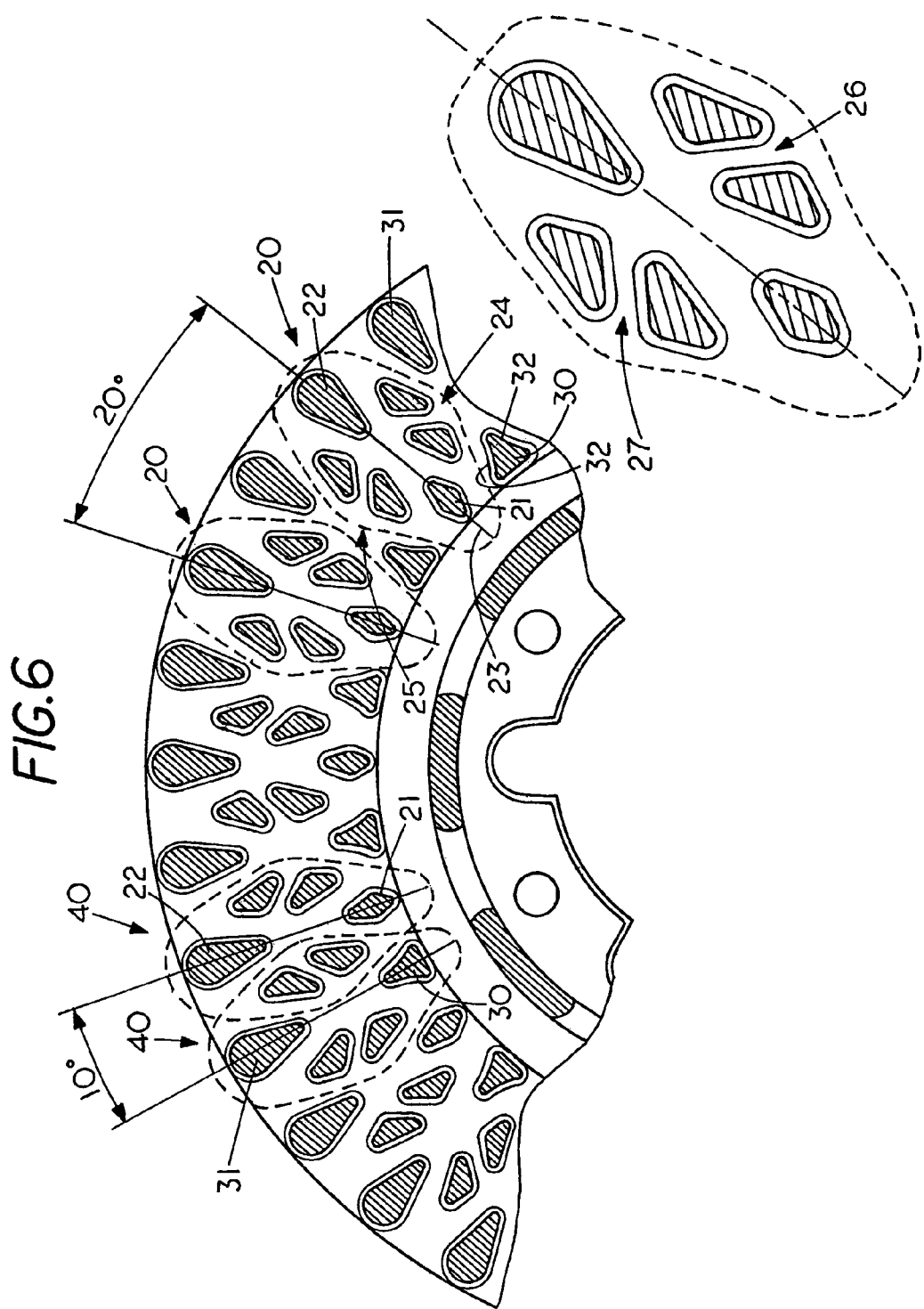

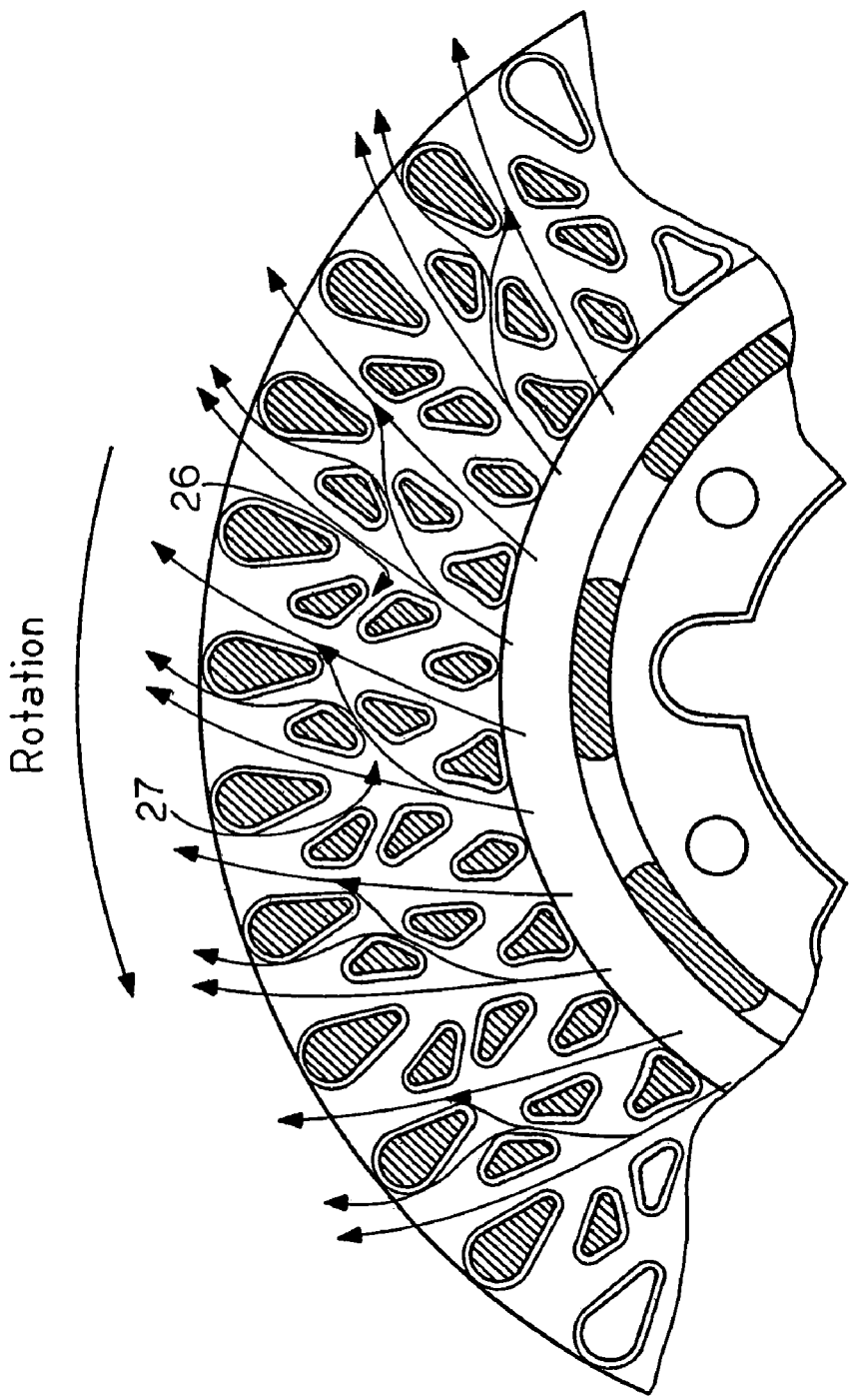

SELF-VENTILATING DISC BRAKE ROTOR

This application is a continuation-in-part application of application Ser. No. 10/459,766, filed Jun. 12, 2003 now abandoned, which is a continuation-in-part application of application Ser. No. 09/888,942, filed Jul. 25, 2001, now abandoned.

FIELD OF THE INVENTION

This invention relates to brake apparatus. More particularly although not exclusively it discloses an improved rotor for vehicle disc brakes.

BACKGROUND OF THE INVENTION

Existing disc brake rotors typically comprise a central hub or hat co-axial with a surrounding ring and a brake band adapted for frictional contact with brake pads on each side. With self-ventilating disc brakes there are two spaced apart parallel rings and bands provided on each rotor which are cooled by a radial flow of air outwardly through channels formed between them. This flow largely results from centrifugal forces generated by rotation of the rotor.

Prior art rotors have generally attempted to arrange pillars and other internal supporting structures so as to make their induction of flow dependent on the direction of rotation of the rotor when in use so that separate rotor castings are required for the right and left hand sides of a vehicle. Where symmetrical patterns of supporting pillars or structures have been employed, little attention has been given to the provision of channeling formations within the pattern. The result is a tendency to excessive temperature generation during severe braking which can cause swelling, cracking and stress fatigue in the rotor disc.

It is an object of at least preferred embodiments of the present invention to address or ameliorate the above mentioned disadvantages or at least provide a useful alternative.

SUMMARY OF THE INVENTION

In a first broad form of the invention there is provided a disc brake rotor having a central hub coaxial with and supporting annular rings which form an inboard brake disc and an outboard brake disc for engagement with brake pads, said inboard disc and said outboard disc maintained in a parallel spaced apart configuration by pillars with channels defined between said pillars whereby in use of the rotor air is drawn in through vent means and then radially outwardly through said channels as the rotor turns, said pillars arranged in repeating clusters of six with each cluster in cross section including radially aligned inner and outer pillars with pairs of intermediate pillars positioned symmetrically in a median area of said inboard and outboard brakes discs; one pair of said intermediate pillars on each side of a radially aligned central axis defined by said radially aligned inner and outer pillars; said pairs of intermediate pillars positioned to support said inboard and outboard brake discs against mechanical distortion from application of said brake cads during heavy braking; each pair of said pairs of radially aligned intermediate pillars defining a channel between the pillars comprising said pair; said channel offset from a radially aligned direction.

Preferably, sides of said central hub are inclined outwardly towards a base of said central hub and an outer periphery of said central hub leads into a heat dam.

Preferably, said vent means include inlet vents on the outboard side located in an outer face of said heat dam.

Preferably, said vent means further include inlet vents on the inboard side of said rotor.

Preferably, ports for said inlet vents on the inboard side of said rotor are located between an inner periphery of one of said rings and a contoured inlet horn formed by an inboard face of said central hub.

Preferably, said inlet vents on said inboard and said outboard sides of said rotor lead into said channels between said rings, said channels being defined by pillars.

Preferably, said pillars are arranged in clusters with each cluster being symmetrical with respect to rotational directions of said rotor.

Preferably, each cluster defines a respective pair of said channels and cooling air passes equally through one or another thereof in accordance with direction of rotor rotation.

Preferably, each cluster includes pillars, which in cross-section are of elongated triangular shape and have overlapping edges to define said pair of said channels.

Preferably, said inner pillars of each of said clusters have an elongated diamond shape in cross-section and alternate with pillars which are triangular or bell shaped in cross-section, said inner pillars being adapted to deflect and draw cooling air from said inlet vents into said channels.

Preferably, said repeating clusters of six pillars are circumferentially disposed between said annular rings at angular intervals of 20 degrees.

Preferably, each outer pillar of said radially aligned inner and outer pillars is in a cross section form approximating that of an isosceles triangle; a base of said triangle adjacent to an outer periphery of said annular rings.

Preferably, each inner pillar of said radially aligned inner and outer pillars is in cross section of oviform or diamond shape; a long axis of said oviform shape radially aligned.

Preferably, each adjoining pair of said repeating clusters of six pillars is symmetrical about a line defined by an intermediate radially aligned inner pillar and outer pillar.

Preferably, said outer pillar is of a cross section form approximating that of a tear drop; a base of said tear drop coincident with an outer periphery of said annular rings.

Preferably, each inner pillar of said radially aligned intermediate pillars is in cross section of a form approximating that of a bell; the base or mouth of said bell adjacent to said inner periphery of said annular rings.

Preferably, each said cluster of six pillars includes two symmetrically opposed pairs of intermediate pillars; each pair of said opposed pairs of intermediate pillars defining an air flow channel adapted to dissipate heat from surrounding regions of said discs.

Preferably, said repeating clusters of six pillars are circumferentially disposed between said annular rings at angular intervals of 10 degrees; adjoining pairs of clusters overlapping so as to share a pair of said radially aligned intermediate pillars.

Preferably, each outer pillar of said radially aligned inner pillar and outer pillar is in cross section form approximating that of an isosceles triangle with rounded base; said base adjacent to an outer periphery of said annular rings.

Preferably, alternate ones of inner pillars of said radially aligned inner pillar and outer pillar are in cross section of oviform or diamond shape and bell shape.

Preferably, patterns of air flow are induced by rotation of said rotor; said air flow directed from an inner periphery of said rings through channels between selected pillars of said repeating clusters of pillars to exit from said rotor at said outer periphery of said rings.

Preferably, said patterns of air flow are predetermined by direction of rotation of said rotor; a clockwise rotation determining a first pattern of said air flow and an anticlockwise rotation determining a second pattern; said second pattern being mirror reversed from said first pattern.

BRIEF DESCRIPTION OF THE DRAWINGS

The currently preferred embodiment of the invention will now be described with reference to the attached drawings in which:

FIG. 6 is a further detail of a portion of a cross-section indicating repeating patterns of pillar clusters.

FIG. 7 is a further view of the portion of the cross section of FIG. 6 indicating air flow patterns.

DETAILED DESCRIPTION OF THE PREFERRED EMBODIMENTS

First Embodiment

Figure 1:
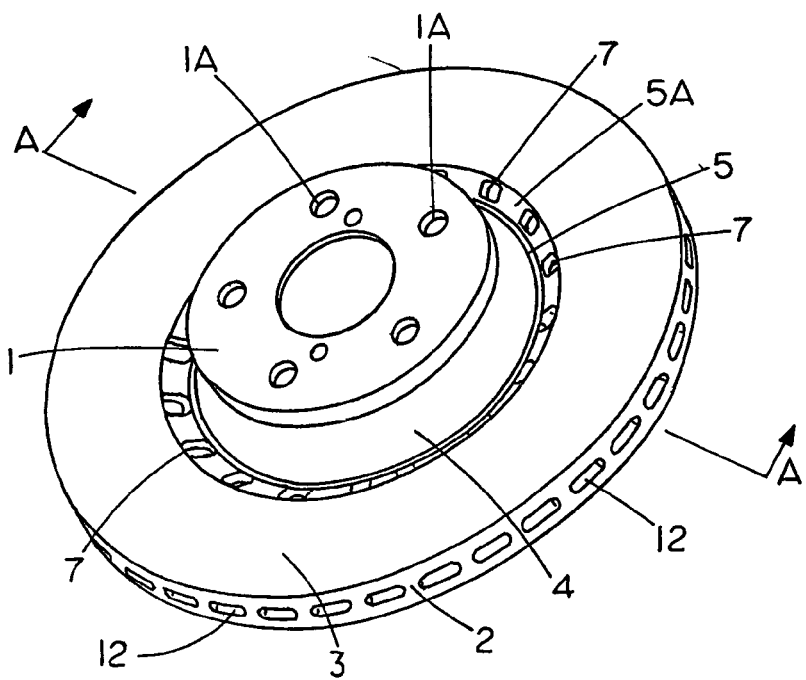
FIG. 1 is a perspective view of a brake rotor from the outboard side.
Figure 2:
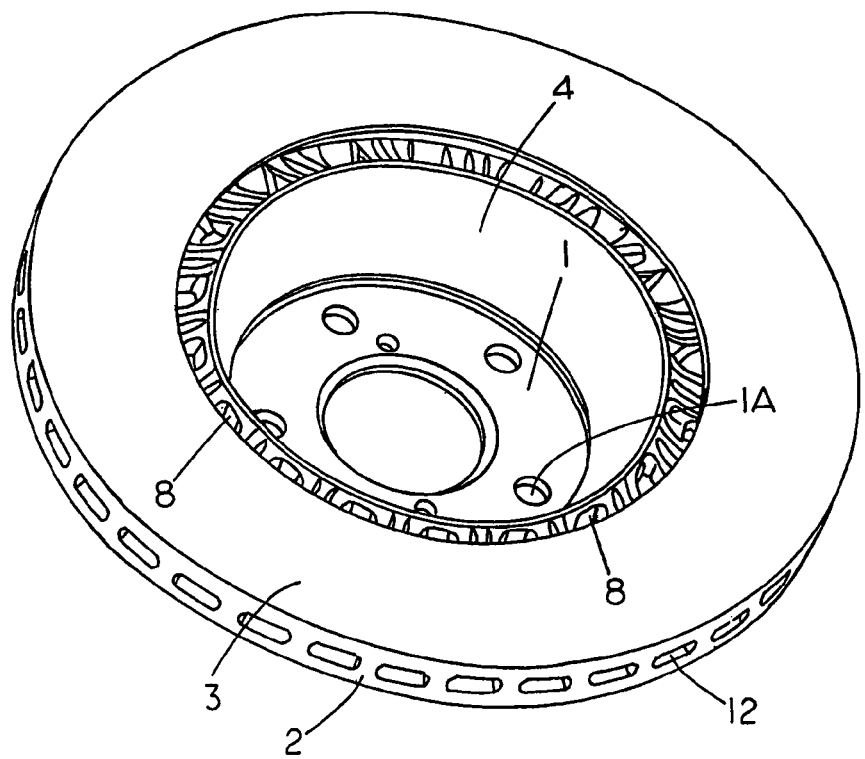
FIG. 2 is a perspective view of the rotor from the opposite inboard side.
Figure 3:
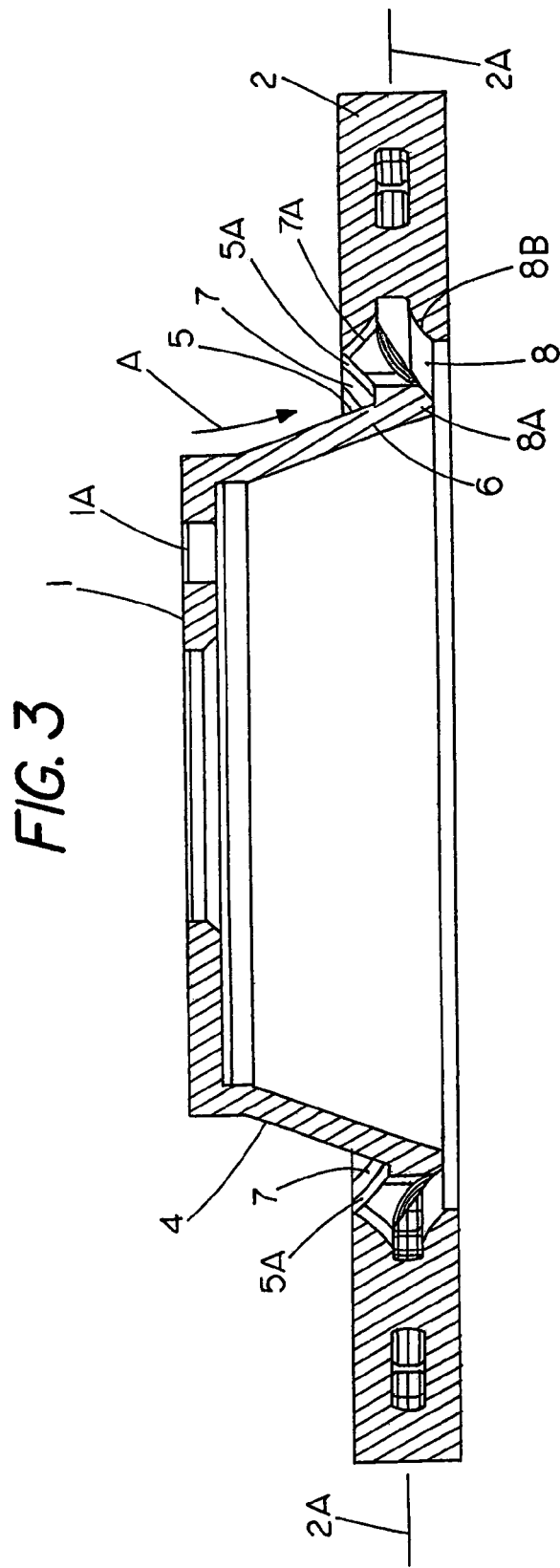
FIG. 3 is a cross-sectional view of the rotor along the lines A—A of FIG. 1 showing the preferred form of the vent ports.

Referring first to FIGS. 1 to 3 there is a brake rotor comprising a central hub or hat 1 for mounting a vehicle wheel by means of bolts passing through apertures 1A. Surrounding the hat and co-axial with it are rings 2 which form brake bands 3 on the inboard and outboard sides for engagement with brake pads (not shown). The rings 2 are supported in a spaced apart parallel configuration by pillars with radial ventilation channels formed between them as described in more detail later. In accordance with a preferred embodiment of the invention the sides 4 of the hat or hub are inclined outwardly at about 4 degrees as best shown in FIG. 3. The outer periphery of the hat leads into a deep heat dam 5. This construction closely aligns the web 6 with the centre-line 2A of the rotor rings 2 to reduce vibration, better defines a heat distortion point for the rotor and also facilitates a smooth flow of air into the outboard vent ports 7. These ports 7 receive a flow of shown in FIG. 3. The outer periphery of the hat leads into a deep heat dam 5. This construction closely aligns the web 6 with the centre-line 2A of the rotor rings 2 to reduce vibration, better defines a heat distortion point for the rotor and also facilitates a smooth flow of air into the outboard vent ports 7. These ports 7 receive a flow of cooling air unobstructed by the front wheel assembly and splash plate. They are preferably rectangular in shape and are set into the outer face 5A of the heat dam in order to pick up the air flow along inclined sides of the hat (see arrow A in FIG. 3). The vent outboard wall 7A preferably has a large radius surface (e.g about 20 mm) to minimise flow friction by smoothly merging into the ventilation channels between the pillars. Also shown in FIGS. 2 and 3 are vent ports 8 leading into the ventilation channels from the inboard side of the rotor. These ports 8 are distributed around the inner periphery of the rings 2. The port walls are defined by a contoured inlet horn 8A formed by the inboard face of the tapered hat sides 4. The opposite port walls 8B are formed by the inner periphery of the rings 2. They are also contoured to lead smoothly into the ventilation channels. To assist the radial inflow of air into the ports 8 the wall 8B preferably extends out further from the rotor centre line 2A than the opposite horn 8A.

Second Embodiment

Figure 4:
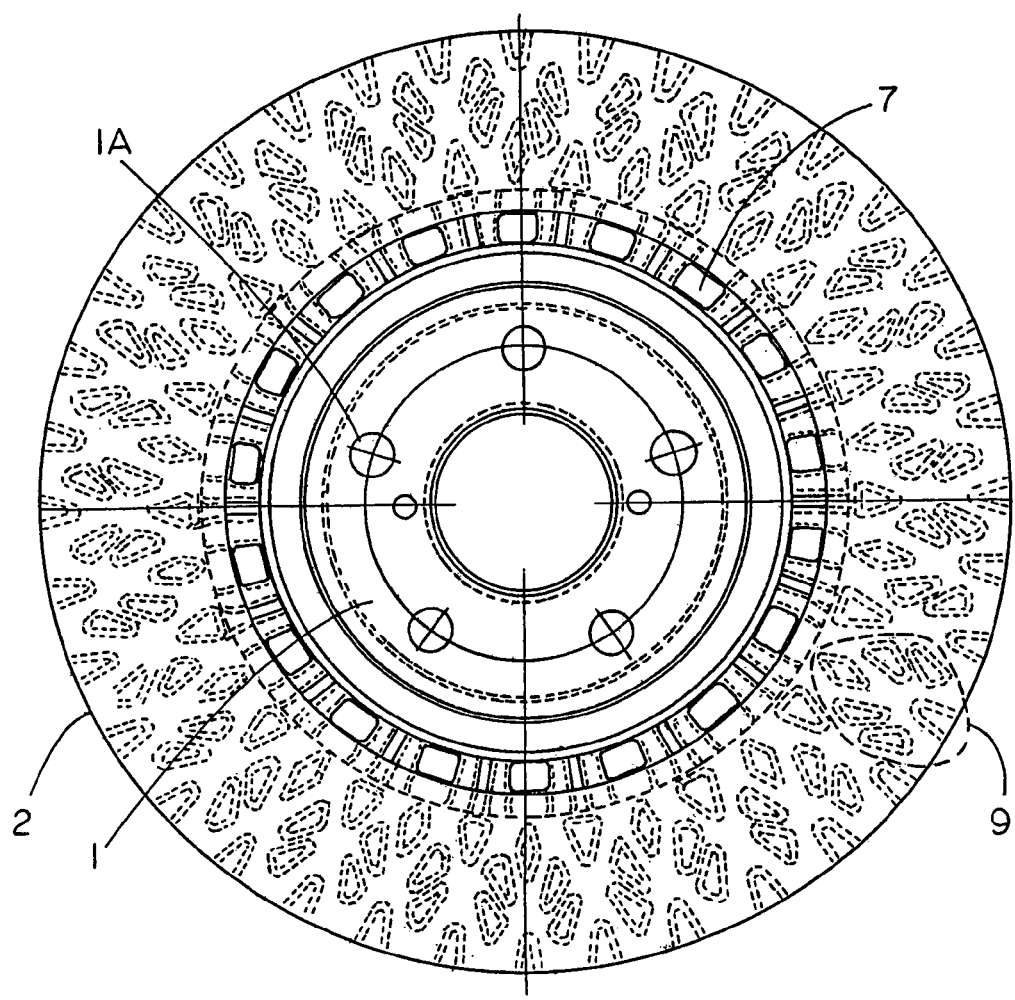
FIG. 4 is an elevation view of the outboard side of the rotor.
Figure 5:
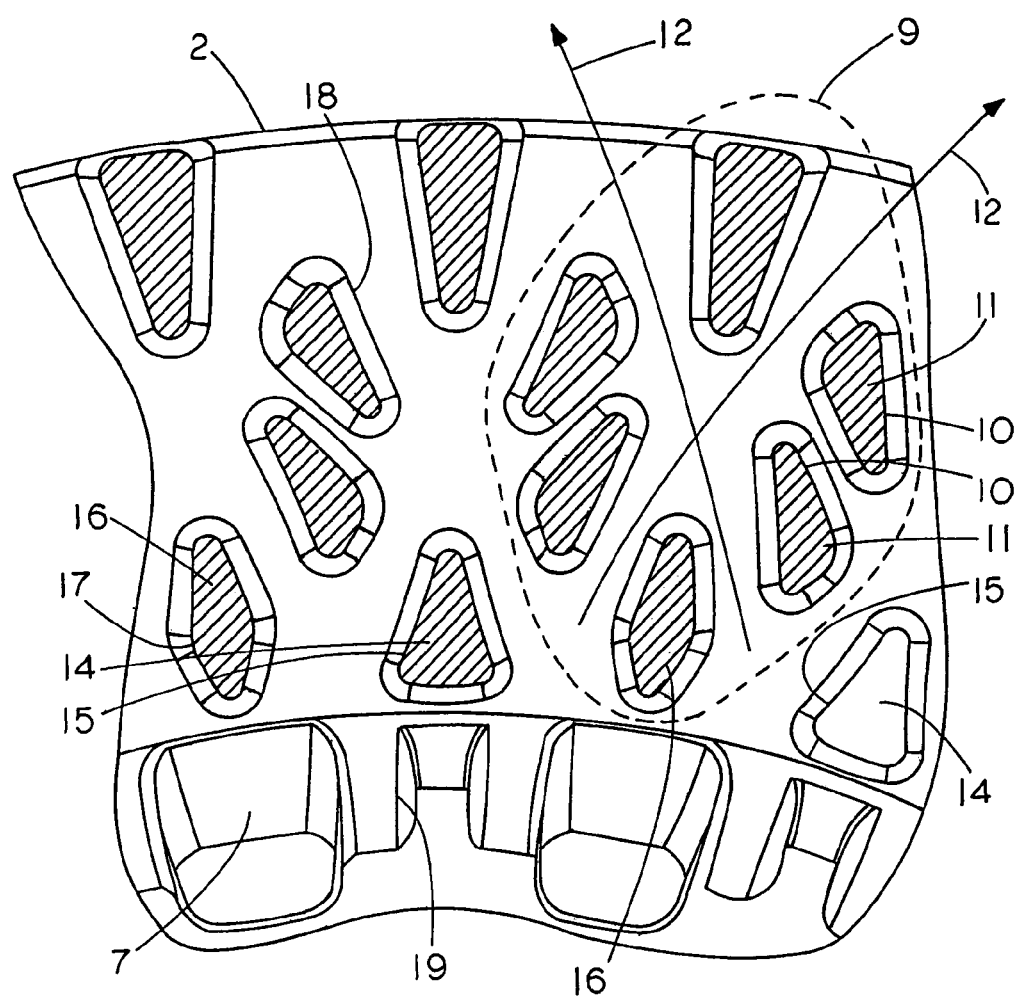
FIG. 5 is a detailed view showing the preferred cross-sectional shape and arrangement for the pillars.

A preferred arrangement of the support pillars between the rings is shown in FIGS. 4 and 5. With this embodiment the pillars are disposed in repeating clusters of six units as indicated by broken line 9. Each cluster by means of the overlapping edges 10 and the elongated triangular shape of the pillars 11 defines radial air flow channels 12 out between the rings in accordance with the direction of rotation. There are also inner pillars 14 which are preferably triangular or bell shaped in cross-section so that the curved edges 15 act as air scoops to draw air in through the vent ports 8 and 9. Alternating with these pillars 14 are elongated diamond shaped pillars 16 which are asymmetrical in the radial direction so that the widest point 17 is offset toward the centre of the rotor. This shape has been found to better deflect and draw the air from the vent ports into the channels.

As the layout of each pillar cluster is preferably symmetrical with respect to the two opposite rotational directions dedicated left and right rotors are unnecessary with this embodiment. The air flow passes equally through either of the channels 12 in accordance with the direction of rotation.

The bases of the pillars are preferably radiused at 18 to prevent stress concentrations. Strengthening ribs 19 have also been formed on the web between the outboard ports to prevent cracking.

With further reference to FIGS. 4 and 5 there is disclosed a disc brake rotor having a central hub coaxial with and supporting annular rings which form an inboard brake disc and an outboard brake disc for engagement with brake pads, the inboard disc and the outboard disc maintained in a parallel spaced apart configuration by pillars with channels defined between the pillars whereby in use of the rotor air is drawn in through vent means and then radially outwardly through the channels as the rotor turns, the pillars arranged in repeating clusters of six with each cluster in cross section including radially aligned inner and outer pillars with pairs of radially aligned intermediate pillars positioned symmetrically one pair on each side of a radially aligned central axis defined by the radially aligned inner and outer pillars; each pair of the pairs of radially aligned intermediate pillars defining a channel between the pillars comprising the pair; the channel offset from a radially aligned direction.

Each cluster of six pillars may be defined in a first grouping 20 as shown by the dashed outlines of FIG. 6. The repeating clusters of six pillars of the presently described grouping are circumferentially disposed at 20 degree angular separation, so that there are 18 such clusters in total.

In this grouping the radially aligned inner and outer pillars are comprised of an inner pillar 21 of generally oviform or diamond cross sectional shape and an outer pillar 22 in cross section shaped somewhat like an isosceles triangle with, in at least one preferred embodiment, a rounded base. The height of the isosceles triangle is significantly greater than the base and lies along the central axis 23 of the cluster. Similarly the long axis of the oviform or diamond shaped inner pillar also lies along the central axis 23.

The pairs of radially aligned intermediate pillars 24 lying to the right of the central axis 23, and the corresponding pair of intermediate pillars 25 on the left form a herringbone pattern, each pair defining a narrow channel 26 and 27 respectively (as indicated on the enlargement of FIG. 6).

These intermediate pairs of pillars perform important structural functions in preventing mechanical distortion in this median area of the inboard and outboard discs during heavy braking. At the same time the heat generated through the braking action will tend to induce thermal distortion. Thus it is highly desirable to combine a maximum cross sectional area of mechanical support with the best possible ventilation in this intermediate area. The configuration of the intermediate pillar pairs of the present invention achieves this by providing the narrow, angled air flow channels 26 and 27 between the pairs, thus combining the required large cross sectional area with adequate air flow.

The actual pattern of air flow and the velocity of air through the pattern of six pillars is a function of both rotational direction and the angular velocity of the rotation. The pattern of air flow for an anti-clockwise rotating disc is shown in FIG. 7. Thus in the anti-clockwise spinning disc of FIG. 7 strong air flow is induced through channel 27 with little if any through channel 26. Nevertheless, as has been indicated by computer analysis and in use measurements, the air flow created through the one pair of pillars provides excellent heat dissipation for each of the 18 clusters. Clearly, by virtue of the symmetry of the six pillar pattern the air flow is mirror reversed for clockwise rotation. Thus the same discs may be mounted to either side of a vehicle.

As can again be seen in FIG. 6 the adjoining clusters of the present grouping are separated by a pair of radially aligned inner and outer pillars 30 and 31 respectively. The outer pillar 31 is identical to the outer pillar 22 defining the central axis of the cluster but the inner pillar 30 is of a different bell-shaped form having concave side edges 32. These inner pillar concave edges act as blades or impellers to accelerate and direct air flow into the cluster.

A second grouping 40 of six pillars to form each cluster may be chosen using the radial line defined by the inner and outer pillars 30 and 31 separating the first described clusters as a new central axis with, in this grouping the inner pillars alternating between the ovoid or diamond shape pillars 21 and the bell shaped pillars 30. These clusters then have an angular separation of 10 degrees as shown in FIG. 6, adjoining clusters overlapping so as to share either radially aligned intermediate pairs of pillars 24 or 25 alternately.

The optimization of air flow was firstly derived through computer modeling of the pillar cluster to arrive at the present pattern. However to, realize this complicated pattern, and particularly that of the desired narrow channel between the pairs of radially aligned intermediate pillars in a production process proved very difficult.

The casting of the discs and pillars is effected using a pre-moulded sand core. This is a negative of the final product and is produced by the injection of a sand mixture and bonding agent into a cavity die. The production of the core forming die in itself provided considerable machining difficulties. In addition it was found that special provisions had to be made in the die to allow for the elimination of air traps in the fine interstices within the cluster formations. Normally, casting of the rotor is effected by introducing the molten metal from points around the periphery of the sand core but this method could not provide adequate filling of the pillar structures and casting had to be by introduction of the metal via a spider feeding the internal periphery of the hat structure.

The above describes only some embodiments of the present invention and modifications obvious to those skilled in the art can be made thereto without departing from the scope and spirit of the present invention.

For example the design of the hat and brake bands as well as the shape and configuration of the vent ports and pillars may be changed according to application. Also while the rotor is preferably cast using G220 grey iron the invention extends to the use of any other suitable material.

The invention claimed is:

1. A disc brake rotor having a central hub coaxial with and supporting annular rings which form an inboard brake disc and an outboard brake disc for engagement with brake pads, said inboard disc and said outboard disc maintained in a parallel spaced apart configuration by pillars with channels defined between said pillars whereby in use of the rotor, air is drawn in through vent means and then radially outwardly through said channels as the rotor turns, said pillars arranged in repeating clusters of six; said pillars in cross section including radially aligned inner and outer pillars with pairs of intermediate pillars positioned radially between said inner and outer pillars; one pair of said intermediate pillars on each side of a radially aligned central axis defined by said radially aligned inner and outer pillars; said pairs of intermediate pillars positioned to support said inboard and outboard brake discs against mechanical distortion from application of said brake pads during heavy braking; each pair of said pairs of radially aligned intermediate pillars defining a channel between the pillars comprising said pair; said channel offset from a radially aligned direction.

2. The disc brake rotor as claimed in claim 1 wherein sides of said central hub are inclined outwardly towards a base of said central hub and an outer periphery of said central hub leads into a heat dam.

3. The disc brake rotor as claimed in claim 2 wherein said vent means include inlet vents on an outboard side located in an outer face of said heat dam.

4. The disc brake rotor as claimed in claim 3 wherein said vent means further include inlet vents on an inboard side of said rotor.

5. The disc brake rotor as claimed in claim 4 wherein ports for said inlet vents on the inboard side of said rotor are located between an inner periphery of one of said rings and a contoured inlet horn formed by an inboard face of said central hub.

6. The disc brake rotor as claimed in claim 5 wherein said inlet vents on said inboard and said outboard sides of said rotor lead into said channels between said rings, said channels being defined by said pillars.

7. The disc brake rotor as claimed in claim 6 wherein said pillars are arranged in clusters with each cluster being symmetrical with respect to rotational directions of said rotor.

8. The disc brake rotor as claimed in claim 7 wherein each cluster defines a respective pair of said channels and cooling air passes equally through one or another thereof in accordance with direction of rotor rotation.

9. The disc brake rotor as claimed in claim 8 wherein each cluster includes pillars which in cross-section are of elongated triangular shape and have overlapping edges to define said pair of said channels.

10. The disc brake rotor as claimed in claim 9 wherein said inner pillars of each of said clusters have an elongated diamond shape in cross-section and alternate with pillars which are triangular or bell shaped in cross-section, said inner pillars being adapted to deflect and draw cooling air from said inlet vents into said channels.

11. The disc brake rotor as claimed in claim 1 wherein said repeating clusters of six pillars are circumferentially disposed between said annular rings at angular intervals of 20 degrees.

12. The disc brake rotor as claimed in claim 11 wherein each outer pillar of said radially aligned inner and outer pillars is in a cross section form approximating that of an isosceles triangle; a base of said triangle adjacent to an outer periphery of said annular rings.

13. The disc brake rotor as claimed in claim 12 wherein each inner pillar of said radially aligned inner and outer pillars is in cross section of oviform or diamond shape, a long axis of said oviform shape or said diamond shape is radially aligned.

14. The disc brake rotor as claimed in claim 13 wherein each adjoining pair of said repeating clusters of six pillars is symmetrical about a line defined by an intermediate radially aligned inner pillar and outer pillar.

15. The disc brake rotor as claimed in claim 14 wherein said outer pillar is of a cross section form approximating that of a tear drop; a base of said tear drop coincident with said outer periphery of said annular rings.

16. The disc brake rotor as claimed in claim 15 wherein each inner pillar of said radially aligned intermediate pillars is in cross section of a form approximating that of a bell, a base or mouth of said bell adjacent to an inner periphery of said annular rings.

17. The disc brake rotor as claimed in claim 16 wherein each said cluster of six pillars includes two symmetrically opposed pairs of intermediate pillars; each pair of said opposed pairs of intermediate pillars defining an air flow channel adapted to dissipate heat from surrounding regions of said discs.

18. The disc brake rotor as claimed in claim 1 wherein said repeating clusters of six pillars are circumferentially disposed between said annular rings at angular intervals of 10 degrees; adjoining pairs of clusters overlapping so as to share a pair of said radially aligned intermediate pillars.

19. The disc brake rotor as claimed in claim 13 wherein each outer pillar of said radially aligned inner pillar and outer pillar is in cross section form approximating that of an isosceles triangle with rounded base; said base adjacent to an outer periphery of said annular rings.

20. The disc brake rotor as claimed in claim 13 wherein alternate ones of inner pillars of said radially aligned inner pillar and outer pillar are in cross section of either oviform, diamond shape or bell shape.

21. The disc brake rotor as claimed in claim 20 wherein patterns of air flow are induced by rotation of said rotor; said air flow directed from an inner periphery of said rings through channels between selected pillars of said repeating clusters of pillars to exit from said rotor at said outer periphery of said rings.

22. The disc brake rotor as claimed in claim 21 wherein said patterns of air flow are predetermined by direction of rotation of said rotor; a clockwise rotation determining a first pattern of said air flow and an anticlockwise rotation determining a second pattern; said second pattern being mirror reversed from said first pattern.

* * * * *